Metherd & Young,
Bee Hive.

No. 113,187. Patented Mar. 28, 1871.

Witnesses.
C. L. Evert
Jas. C. Hutchinson

Inventor.
John F. Metherd
Solomon Young,
per
Alexander Mason
attys.

United States Patent Office.

JOHN F. METHERD AND SOLOMON YOUNG, OF UNION CITY, INDIANA.

Letters Patent No. 113,187, dated March 28, 1871.

IMPROVEMENT IN BEE-HIVES.

The Schedule referred to in these Letters Patent and making part of the same.

*To all whom it may concern:*

Be it known that we, JOHN F. METHERD and SOLOMON YOUNG, of Union City, in the county of Randolph and in the State of Indiana, have invented certain new and useful Improvements in Bee-Hives; and do hereby declare that the following is a full, clear, and exact description thereof, reference being had to the accompanying drawing and to the letters of reference marked thereon making a part of this specification The nature of our invention consists in the construction and arrangement of a "bee-hive," as will be hereinafter more fully set forth.

In order to enable others skilled in the art to which our invention appertains to make and use the same, we will now proceed to describe its construction and operation, referring to the annexed drawing, in which—

Figure 1:
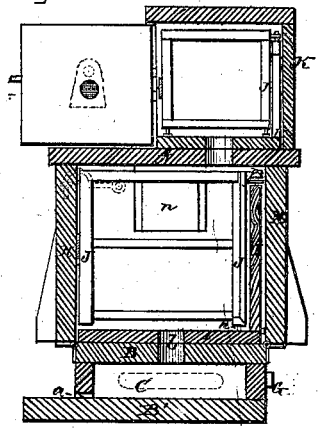

Figure 1 is a longitudinal vertical section, and

Figure 2:
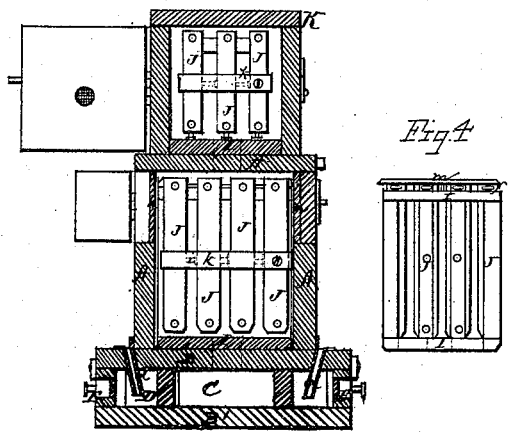
Figure 3:
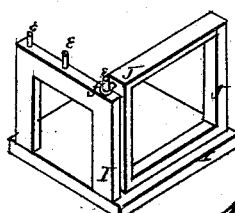

Figure 2, a transverse vertical section of our bee-hive;

Figure 3 is a perspective view, and

Figure 4:
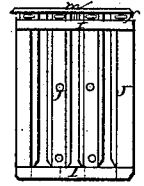

Figure 4, an end view of the stand on which the comb-frames are hung.

Our entire hive is of double construction, as follows:

A represents the brood-chamber, with its bottom B.

Under this bottom is another bottom, B', leaving a chamber, C, between them, into which the bees first go through the entrance $a$; and then through a round hole or opening, $b$, in the upper bottom B, they enter into the hive-proper.

The object of this double bottom is to operate against the moth without interfering with the ingress, egress, and working of the bees. The moth, as is well known, seeks entrance at all points, and will go in at the entrance of the bees, which, if they do so in this construction, they have to pass double guards—first, at the entrance $a$ for the bees; and second, at the round opening $b$ through the upper bottom, before they can get into the hive-proper or working department.

The moth being thus defeated in entering the hive-proper, will naturally go out at the place where they entered and seek some other entrance, and will next find the oblong tube $d$ on either side of the hive, and in the upper bottom B, which tube is so constructed as to admit a moth and not a bee.

The tubes $d\ d$ lead into moth-traps, D D, formed one on each side of the chamber C, between the bottoms B B', and are provided with glass doors, E.

The moth enters through the tube $d$, and, seeing the lights in the doors E to said moth-trap, on either side, it seeks an outlet through said lights, and once in said trap it can never get out until let out, and where it can be destroyed.

At the back end of the double bottom is a door, G, to the chamber C, which admits of cleaning all the dirt and filth that may be accumulated by virtue of the double bottom.

On either side of the main hive or brood-chamber A is a falling door, H, which is of great advantage for the following reasons:

By the doors falling, the sash or movable frame I containing the honey can be pulled out on the doors, the doors serving as a stand for the frame while the honey is being extracted.

The opposite door having been laid down at the same time, not only gives the bees a chance to escape in that direction, but in replacing the sash or frame it is done without crushing the bees that may cling to the opposite side of the sash or frame; and while said opposite door remains open gives the bees a chance to escape from said opposite side and resume their original position before closing the door.

The sash or frame I is L-shaped, as shown, with pins $e\ e$ on top of the vertical part.

The comb-frames J J are provided with eye-screws, $f\ f$, to hang on the pins $e\ e$, and also with pins $h$, to be inserted in the horizontal part of the frame I.

Other pins, $i\ i$, hold the frames a suitable distance apart, and the loose ends of the frames are connected together by a metal-strap, $k$, as shown in fig. 2.

A slat, $m$, is also placed on the pins $e\ e$, above the eye-screws $f\ f$, to prevent the same from slipping off.

The main hive is also provided with side lights $n$.

On top of the brood-chamber A is the honey-chamber K, containing a similar sash, I, with frames J J, which makes it not only an independent receptacle for honey, but, having movable frame or sash, the honey may be extracted from said movable frame in the top part without disturbing the whole colony of bees.

Having thus fully described our invention,

What we claim as new, and desire to secure by Letters Patent, is—

The moth-chambers D, with entrances $d\ d$, glass doors E E, and central chamber C, and opening $b$, to a comb-frame hive, constructed substantially as and for the purposes set forth.

In testimony that we claim the foregoing we have hereunto set our hands this 26th day of January, 1871.

JOHN F. METHERD.
SOLOMON YOUNG.

Witnesses:
DAVID COMBS,
JAMES COLLIER.